P. HOLMGREN.
SPOKE TIGHTENER FOR VEHICLE WHEELS.
APPLICATION FILED SEPT. 29, 1914.

1,150,193. Patented Aug. 17, 1915.

WITNESSES:
Wm. C. Schmitt
Rowena Cochran

INVENTOR
Peter Holmgren.

UNITED STATES PATENT OFFICE.

PETER HOLMGREN, OF BEAVERTON, OREGON, ASSIGNOR OF ONE-FOURTH TO A. W. HANDY, OF BEAVERTON, OREGON.

SPOKE-TIGHTENER FOR VEHICLE-WHEELS.

1,150,193.   Specification of Letters Patent.   Patented Aug. 17, 1915.

Application filed September 29, 1914. Serial No. 864,148.

*To all whom it may concern:*

Be it known that I, PETER HOLMGREN, a citizen of the United States, and a resident of Beaverton, Washington county, State of Oregon, have invented a new and useful Improvement in Spoke-Tighteners for Vehicle-Wheels, of which the following is a specification.

My invention relates to devices for tightening the spokes of vehicle wheels, when said spokes have become loosened.

The main object of my invention is to provide a convenient, adjustable connection between each spoke and the felly of any vehicle wheel, so that said spokes and felly may be maintained in tight relationship.

It is further my object to so construct this device as to make it capable of being used on any standard vehicle wheel.

Furthermore, my device is so designed as to impose a minimum of wear on the spokes and the felly.

The features which emphasize my invention are all fully shown in the accompanying drawings, in which—

Figure 1:
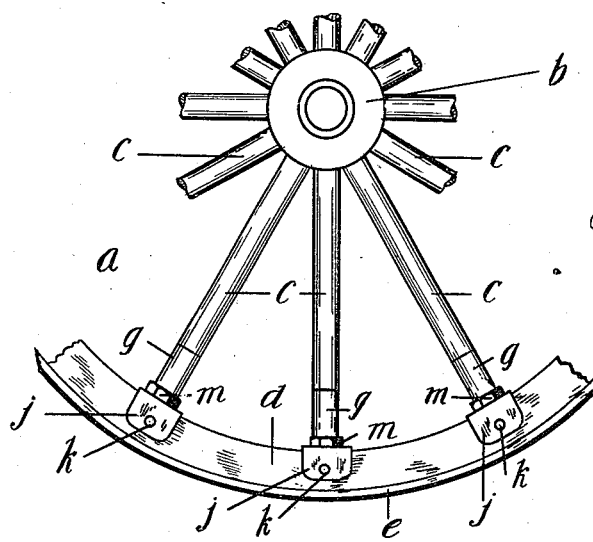
Figure 2:
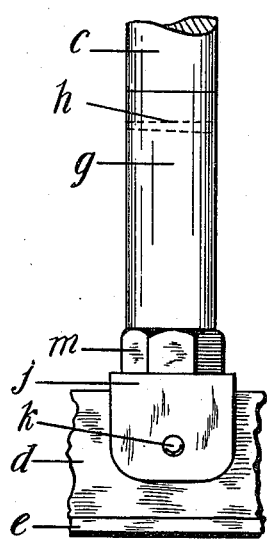
Figure 3:
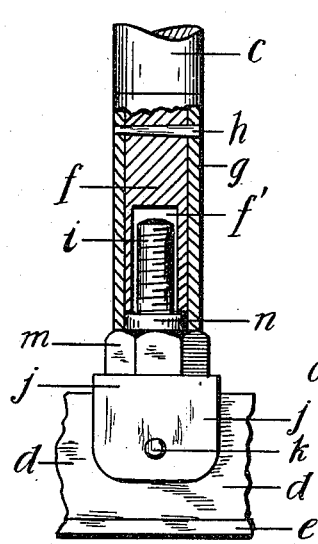
Figure 4:
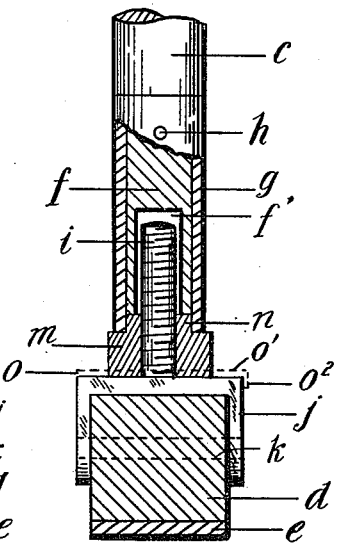
Figure 5:
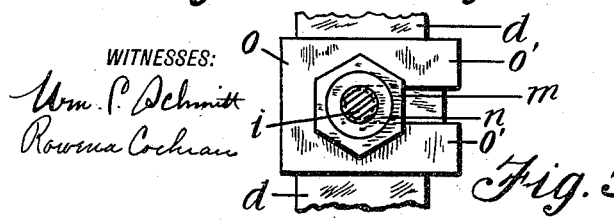

Figure 1 is a fragmental view of a vehicle wheel in which my device is incorporated; Fig. 2 is a larger scaled elevation showing the adjustable connection between the spoke and the felly; Fig. 3 is a sectional view of the parts shown in Fig. 2; Fig. 4 is a transverse sectional view of the parts shown in Figs. 2 and 3, and Fig. 5 is a sectional plan view, showing the shim which is used for taking up the looseness of the spoke.

$a$ represents a vehicle wheel of standard form, $b$, the hub, $c$, the spokes, $d$, the felly, and $e$, the tire. Each spoke, $c$, is reduced at its lower end, as indicated by $f$, in Figs. 3 and 4, said reduced portions being made with longitudinal bores, $f'$. A steel sleeve, $g$, fits over said reduced end of the spoke, and is held rigidly in place by a pin, $h$. The sleeve $g$, extends slightly beyond the end of the reduced portion, $f$, of the spoke. A screw, $i$, is provided on its lower end with a yoke, the side members $j$, of which, are adapted to fit over the felly, $d$, to which they are fixed by a pin, $k$. A nut, $m$, made with an annular shoulder, $n$, encircles the screw, $i$, and the lower end of the sleeve, $g$, bears on said nut. The shoulder, $n$, is adapted to have a running fit inside the sleeve, $g$, and the bore, $f'$, of the spoke end, $f$, is of sufficient diameter to permit the screw, $i$, sufficient clearance therein. A shim, $o$, is made with two legs, $o'$, adapted to straddle the screw, $i$, and of such length that they may be bent over at their ends, as at $o^2$ Fig. 4, and thereby held in place.

The general operation of my device is as follows: When the spoke, $c$, begins to loosen, the nut, $m$, is turned till the looseness is eliminated. The shim, $o$, is then driven into place just beneath the nut, $m$, and the nut is then turned back a trifle in order to throw the strain off the threads of the screw and onto the shim. Any amount of looseness may thus be taken up, and as many shims used as required. Furthermore, all wear will be imposed on the shim, and the spoke or felly will not be injured in any way. Also, by this method, the stress will be taken entirely off the threads of the screw, $i$.

I claim:

1. In a vehicle wheel, including spokes and a felly, an adjustable connection between each spoke and the felly comprising a screw fixed to the felly, a nut threaded on said screw, a sleeve fixed on the outer end of said spoke, said sleeve adapted to bear on the nut, an adjustable filler placed on the screw below the nut so that when the nut is turned down, the stress will be removed from the threads of the screw and thrown directly on the filler.

2. In a vehicle wheel including spokes and a felly, an adjustable connection between each spoke and the felly comprising a screw fixed to the felly, a nut threaded on the screw, a sleeve fixed on the outer end of the spoke, said sleeve adapted to bear on the nut, a shim placed on the screw below the nut, and means for holding said shim in place.

3. In a vehicle wheel including spokes and a felly, an adjustable connection between each spoke and said felly comprising a screw fixed on said felly in radial alinement with the spoke, a nut threaded on said screw, said nut made with an annular shoulder, a sleeve fixed on the outer end of the spoke, said sleeve bearing on the annular shoulder of the nut, an adjustable filler placed on the screw under the nut, and means for holding said filler in place.

PETER HOLMGREN.

Witnesses:
ROWENA COCHRAN,
WM. C. SCHMITT.